United States Patent
Bhesania et al.

(10) Patent No.: US 7,685,322 B2
(45) Date of Patent: Mar. 23, 2010

(54) PORT NUMBER EMULATION FOR WIRELESS USB CONNECTIONS

(75) Inventors: Firdosh K. Bhesania, Kirkland, WA (US); Glen T. Slick, Redmond, WA (US); Randall E. Aull, Kenmore, WA (US)

(73) Assignee: Microsoft Corporation, Redmond, WA (US)

(*) Notice: Subject to any disclaimer, the term of this patent is extended or adjusted under 35 U.S.C. 154(b) by 82 days.

(21) Appl. No.: 11/276,456

(22) Filed: Feb. 28, 2006

(65) Prior Publication Data

US 2007/0204069 A1    Aug. 30, 2007

(51) Int. Cl.
*G06F 3/00* (2006.01)
(52) U.S. Cl. .............................. 710/8; 710/18
(58) Field of Classification Search .................. 710/18, 710/8
See application file for complete search history.

(56) References Cited

U.S. PATENT DOCUMENTS

| | | | | |
|---|---|---|---|---|
| 6,345,319 | B2 * | 2/2002 | Lin et al. ........................ | 710/8 |
| 6,603,744 | B2 * | 8/2003 | Mizutani et al. ............ | 370/310 |
| 6,633,583 | B1 | 10/2003 | Esterson | |
| 6,725,302 | B1 | 4/2004 | Benayoun et al. | |
| 6,813,670 | B1 * | 11/2004 | Yao et al. .................... | 710/302 |
| 2002/0093956 | A1 | 7/2002 | Gurin | |
| 2003/0208629 | A1 | 11/2003 | Parkman | |
| 2004/0203359 | A1 * | 10/2004 | Sasai et al. .................. | 455/41.1 |
| 2004/0203415 | A1 | 10/2004 | Wu | |
| 2004/0205279 | A1 * | 10/2004 | Ohnishi ...................... | 710/305 |
| 2004/0246909 | A1 | 12/2004 | Ahn | |
| 2004/0264427 | A1 * | 12/2004 | Jaakkola et al. ............. | 370/338 |
| 2005/0037807 | A1 | 2/2005 | Dove | |
| 2005/0086389 | A1 | 4/2005 | Chang | |
| 2005/0177669 | A1 | 8/2005 | Peters et al. | |

OTHER PUBLICATIONS

Johnny C. Lee et al, "The Calder Toolkit: Wired and Wireless Components for Rapidly Prototyping Interactive Devices", Proceedings of the 2004 conference on Designing interactive systems: processes, practices, methods, and techniques, 2004, USA.
"USB Wireless LAN Media Access Controller", Atmel Applications Journal, http://www.atmel.fi/dyn/resources/prod_documents/usb_wireless.pdf, 2004, pp. 28-32.

* cited by examiner

*Primary Examiner*—Henry W. H. Tsai
*Assistant Examiner*—Juanito C Borromeo

(57) ABSTRACT

Port number emulation for wireless Universal Serial Bus (USB) connections is provided. Virtual USB port numbers are emulated and associated with external devices that are wirelessly connected to a host device. The associations are maintained in a data structure. When a wireless external device connects with the host device after a period of disconnection, the emulated port number associated with the wireless external device is identified. The virtual port number is provided to a software component in the host device so that the external device can resume interaction with software components in the host device across enumerations. In one example implementation, the virtual USB port numbers are provided to a plug and play manager, which handles the wireless USB devices in a manner similar to wired USB devices.

17 Claims, 7 Drawing Sheets

PORT NUMBER EMULATION FOR WIRELESS USB CONNECTIONS

BACKGROUND

Many electronic devices can be connected to a host computer using a Universal Serial Bus (USB) connection. Typically, these external devices can establish a wired USB connection with the host by being plugged into a USB port. A USB device manager in the host computer generally assigns a port number to each of the ports and associates the external device that connects to the port with that number. In the absence of any other type of unique identifier (such as a serial number), a software component, such as a plug and play manager, can use the assigned USB port number to identify a specific device across enumeration. This mechanism enables the software component to efficiently work with previously connected external devices, without reinstalling the device drivers each time the devices are being plugged into the same USB ports.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides port number emulation for wireless Universal Serial Bus (USB) connections. Virtual USB port numbers are emulated and associated with external devices that are wirelessly connected to a host device. The associations are maintained in a data structure. When a wireless external device reconnects with the host device after a period of disconnection, the emulated port number associated with the wireless external device is identified. The virtual port number is provided to a software component in the host device so that the external device can be uniquely identified by software components in the host device across enumerations. In one example implementation, the virtual USB port numbers are provided to a plug and play manager, which handles the wireless USB devices in a manner similar to wired USB devices.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a system for port number emulation for wireless Universal Serial Bus (USB) devices, the system described is provided as an example and not a limitation. As those skilled in the art will appreciate, the present examples are suitable for application in a variety of different types of systems for handling wireless external devices by emulating identifiers associated with physical connection ports.

Figure 1:
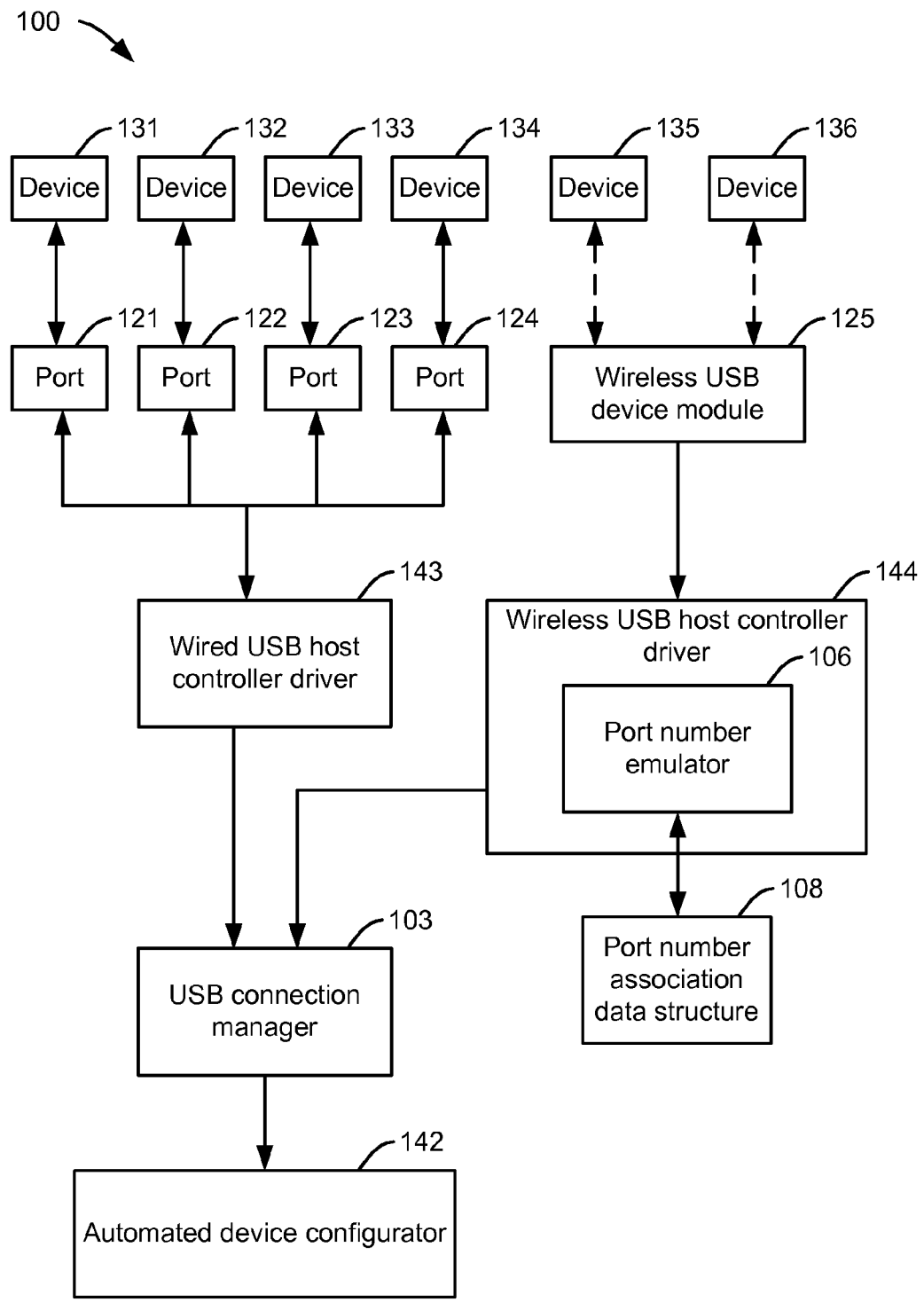
FIG. 1 shows an example system for port number emulation for wireless USB connections.

FIG. 1 shows an example system 100 for port number emulation for wireless USB connections. System 100 is typically included in a host computing device. As shown in FIG. 1, system 100 includes wired USB host controller driver 143, wireless USB host controller driver 144 and USB connection manager 103. Wired USB host controller driver 143 is configured to manage wired connections between external electronic devices 131-134 and the host device. Wireless USB host controller driver 144 is configured to manage wireless USB connections between external electronic devices 135-136. Both controller drivers 143-144 are configured to provide information about the connected electronic devices and the port number associated with the electronic devices to USB connection manager 103. USB connection manager 103 is configured to provide a set of device identifiers to automated device configurator 142. USB connection manager 103 typically receives the information about electronic devices connected by wired or wireless USB and determines the devices identifier based on the information. In one example implementation, USB connection manager 103 is a USBHUB.SYS component.

External devices 131-134 are connected to the host computing device with wired USB connections through USB ports 121-124. Each of the physical ports 121-124 is associated with a port identifier, such as a port number. USB host controller driver 143 is configured to identify a port identifier for each of the external devices 131-134. USB connection manager 103 is configured to provide the port identifier to automated device configurator 142 for enumeration. After a device is connected to a particular physical port, the port identifier is used by automated device configurator 142 to provide similar experience for subsequence connection of the external device across enumerations. This automated connection functionality avoids reinstalling an external device that has already been previously installed.

In this example, external devices 135-136 are connected to the host computing device with wireless USB connections. External devices 135-136 may establish the connection via wireless USB device module 125, such as a wireless USB adaptor. Each of the external devices 135-136 may also be configured to provide a device identifier when the devices are wirelessly coupled to the host device. For example, the device identifier may be provided by an external device to wireless USB host controller driver 144 in a connection request. But since there is no physical port for a wireless connection, a port identifier is not readily available. To enable wireless external devices to be exposed to similar automated connection functionality as with wired external devices, wireless USB host controller driver 144 is configured with port number emulator 106 for creating and managing virtual port identifiers for wireless devices 135-136. Virtual port identifiers have the same structure as other port identifiers but do not identify any physical port. For ease of discussion, virtual port identifiers may be viewed as identifying virtual ports that do not physically exist. Port number emulator 106 is configured to generate a virtual port identifier (such as a port number) for each of the wireless devices 135-136 and associate the virtual port number to the corresponding wireless device. In particular, port number emulator 106 is configured to maintain port number association data structure 108, which can be any type of data structure, such as a table, a database, an array, or the like.

Port number association data structure 108 includes connection context about each virtual port number emulated by port number emulator 106. In particular, port number association data structure 108 may associate each virtual port number with a device identifier that identifies a wireless external device, which has previously established a connection with the host device. Port number association data structure 108 may also indicate, for each virtual port number, whether the wireless external device associated with that virtual port number has an active connection and the interval since the wireless device has last connected to the host device (e.g. last seen). Port number association data structure 108 may further include information about wireless devices that have previously been associated with a virtual port number. For example, the port number association data structure 108 may indicate the association status of a wireless device, such as whether a wireless device has an association with a virtual port number and is connected, an association but is not actively connected, or does not have an association with a virtual port number. All of the above-identified information may be included as connection context in port number association data structure 108

USB connection manager 103 is configured to provide information about external devices 131-136 to automated device configurator 142. Automated device configurator 142, such as a plug and play manager, is configured to install and manage devices 131-136. For example, automated device configurator 142 may be configured to install drivers for external devices 131-136 so that the devices can work with the hardware and software components of the host device. Automated device configurator 142 is typically configured to locate and install a driver for a particular external device that has been coupled to a physical USB port of the host device for the first time. Specifically, automated device configurator 142 may be configured to receive a device identifier that identifies the particular external device and to locate the driver using the device identifier.

To improve efficiency, automated device configurator 142 may be configured to determine whether a particular device coupled at a given USB port has previously been installed and to automatically use a driver that has already been installed for the device. For wired USB devices, automated device configurator 142 is configured to receive a port number that identifies the physical port from USB connection manager 103 when a device has become connected to the host device by being plugged into the physical port. Using the port number, automated device configurator 142 may identify a unique instance of the device, which it may use to determine whether a driver has already been installed. For a wireless USB external device, the virtual port number is provided by the wireless USB host controller driver 144 with the device identifier. In this manner, virtual port numbers are used to provide the automated connection functionality of automated device configurator 142 to wireless USB devices. The automated connection functionality are enabled by USB connection manager 103 through the use of virtual port numbers, rather than making modifications to automated device configurator 142.

The example system 100 described in FIG. 1 enables a wireless USB device to be associated with a virtual port number, even though a physical USB port is not used by the wireless USB device to connect. Legacy applications that currently work with wired USB devices may perform operations that use USB port numbers to identify the wired devices. The virtual port number functionality allows these legacy applications to work seamlessly with wireless USB devices as if they are wired USB devices.

In an example implementation, the system 100 is configured to perform a wired USB connection process as follows:
1. A device is plugged in, and a status change on a specific port is indicated by the hub that contains the port.
2. The hub driver (e.g. USBHUB.SYS) then goes through the steps to enumerate the device on the above port. This may include getting descriptors from the device, resetting the device, etc.
3. From the descriptors, usbhub (the hub driver) builds a set of plug and play (PnP) IDs. This set includes hardware ids, compatible ids, and an instance ID. The instance ID is build using the vendor ID, Product ID, and revision number retrieved from the device descriptors, plus one of the following:
   a. If there is a unique serial number in the device, that value is used.
   b. If there is NOT a unique serial number in the device, the port number that the device is attached to is used.
4. usbhub passes this set of descriptors to PnP.
5. PnP uses the Instance ID to uniquely identify the device instance.
6. PnP checks to see if drivers have been installed for this instance. If so, then PnP causes those drivers to load and the process is complete. If not, then the process continues to step 7.
7. PnP uses the hardware IDs and Compatible IDs to look for the best drivers to install for the device.
8. Once the drivers are identified, they are installed information about the installation is saved based on the Instance ID.

For wireless USB, step 1 in the process described above may be replaced with the following steps:
1. A device sends a connect request that contains a CDID (connection device identifier).
2. The wireless USB host controller driver receives an indication of this request.
3. The wireless USB host controller driver then determines a virtual port number (as described below in conjunction with FIG. 6).
4. If the virtual port number and connection context were found, then the wireless USB host controller driver indicates that a status change on the virtual port has occurred.
5. Continue at step 2 in the process described above.

Figure 2:
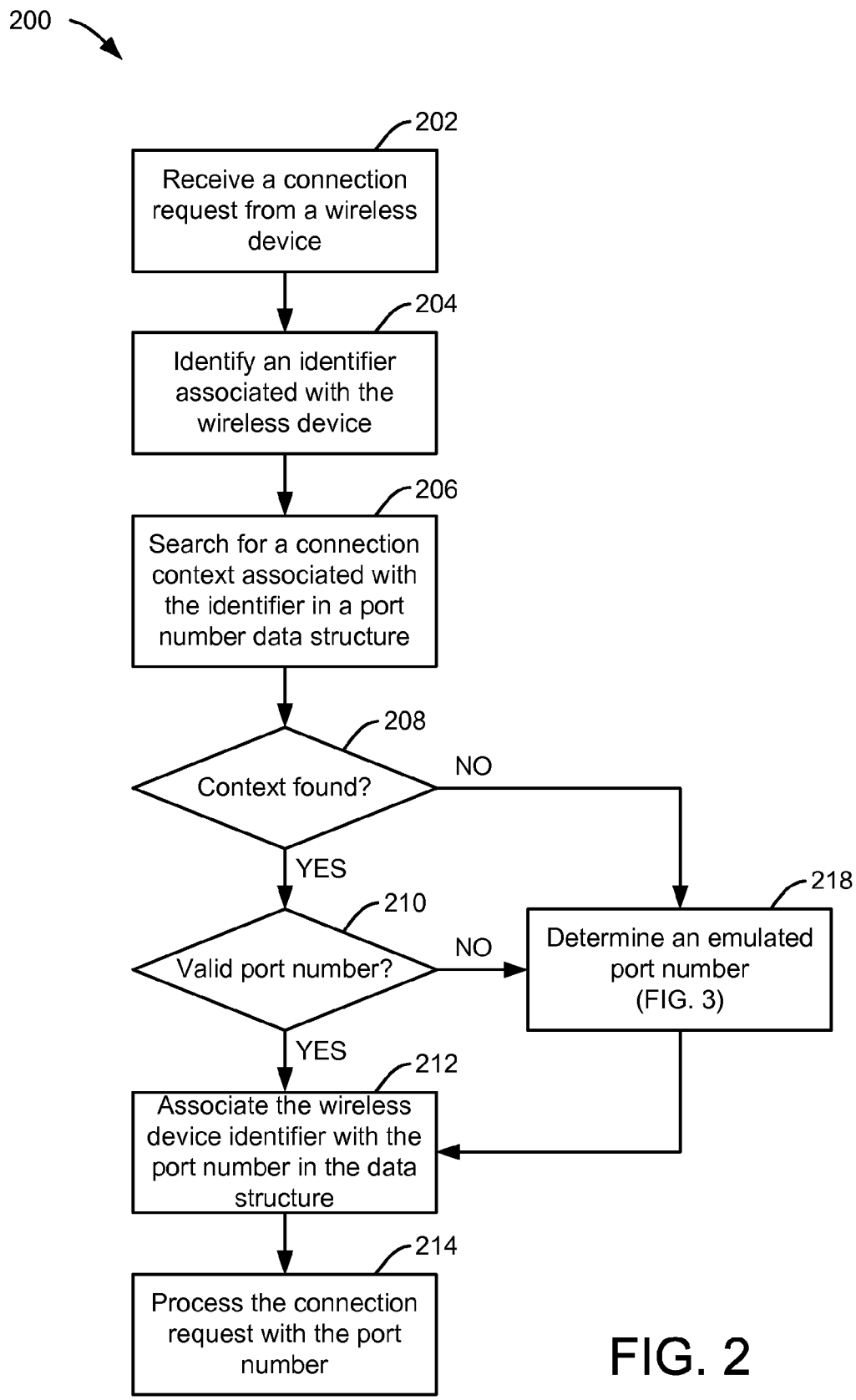
FIG. 2 shows an example process for emulating a virtual port number for a wireless USB device to connect to a host device.

FIG. 2 shows an example process 200 for emulating a virtual port number for a wireless USB device to connect to a host device. Process 200 may be implemented by a wireless host controller driver to provide the wireless USB device with plug and play functionality that is similar to functionality provided for wired USB device. At block 202, a connection request from the wireless USB device is received. At block 204, a device identifier associated with the wireless USB device is identified. At block 206, a port number data structure is searched for a connection context associated with the device identifier. At decision block 208, a determination is made whether the connection context is found. If not, then the wireless USB device may not have been previously installed on the host device and process 200 goes to block 218. If the connection context is found, process 200 moves to decision block 210 where a determination is made whether the port number in the connection context is valid. If the current wireless device has been disconnected to the host device and is now reconnecting, the port number may have been reassigned to another wireless device during the period of disconnection. If the port number is not valid, process 200 continues at block 218 where an emulated port number is determined. An example process for determining an emulated virtual port number will be discussed in conjunction with FIG. 3. Process 200 then moves to block 212.

Returning to decision block 210, if the port number is valid, process 200 goes to block 212 where the wireless device identifier is associated with the port number in the data structure. At block 214, the connection request is processed with the virtual port number. For example, the virtual port number may be provided to a plug and play manager along with the wireless device identifier. The plug and play manager may then determine whether to automatically use an existing driver for the wireless device without reinstalling.

Figure 3:
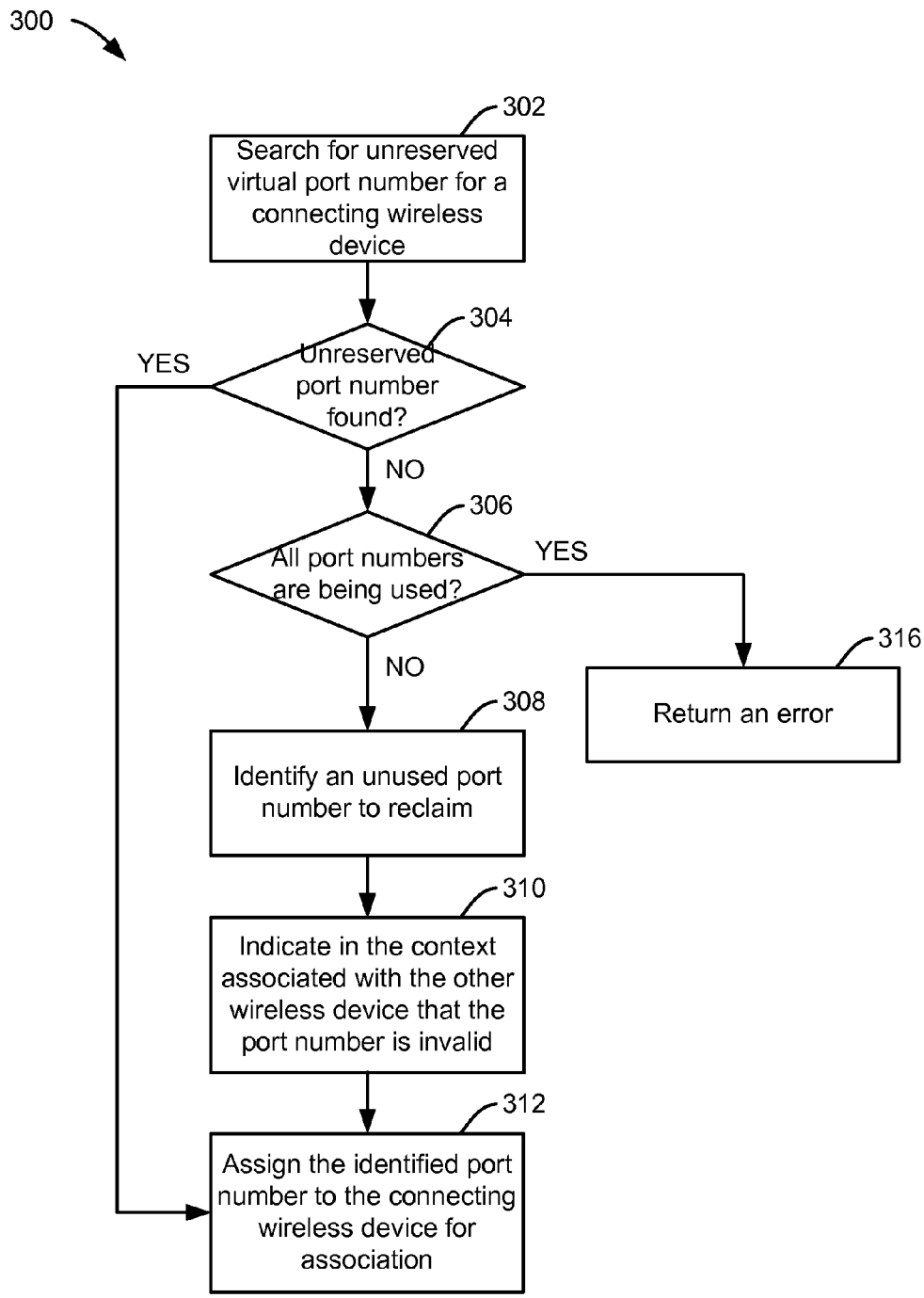
FIG. 3 shows an example process for determining an emulated virtual port number.

FIG. 3 shows an example process 300 for determining an emulated virtual port number. At block 302, a port number data structure is searched for an unreserved virtual port number for a connecting wireless device. An unreserved port number is a virtual port number that is not associated with any wireless USB device. At decision block 304, a determination is made whether an unreserved port number is found. If so, process 300 moves to block 312. If there is no unreserved port number, process 300 goes to decision block 306 where a determination is made whether all of the virtual port numbers are being used. For example, a virtual port number may be used when there is an active connection to a device with that port number. If none of the virtual port numbers is available and all of the ports are being used, process 300 goes to block 316 where an error is returned.

Returning to decision block 306, if not all of the virtual ports are being used, process 300 moves to block 308 where an unused port is identified for reclaiming. For example, a port for reclaiming may be a port with the longest interval since last use, the port that was least frequently used, or the like. The unused port is associated with another wireless device. At block 310, an indication is included in the context associated with the other wireless device that the port number is invalid. The indication is needed because the unused port number is being associated with the connecting wireless device and would not be reserved for the other wireless device. At block 312, the number of identified virtual port number is assigned to the connecting wireless device for association.

Figure 4:
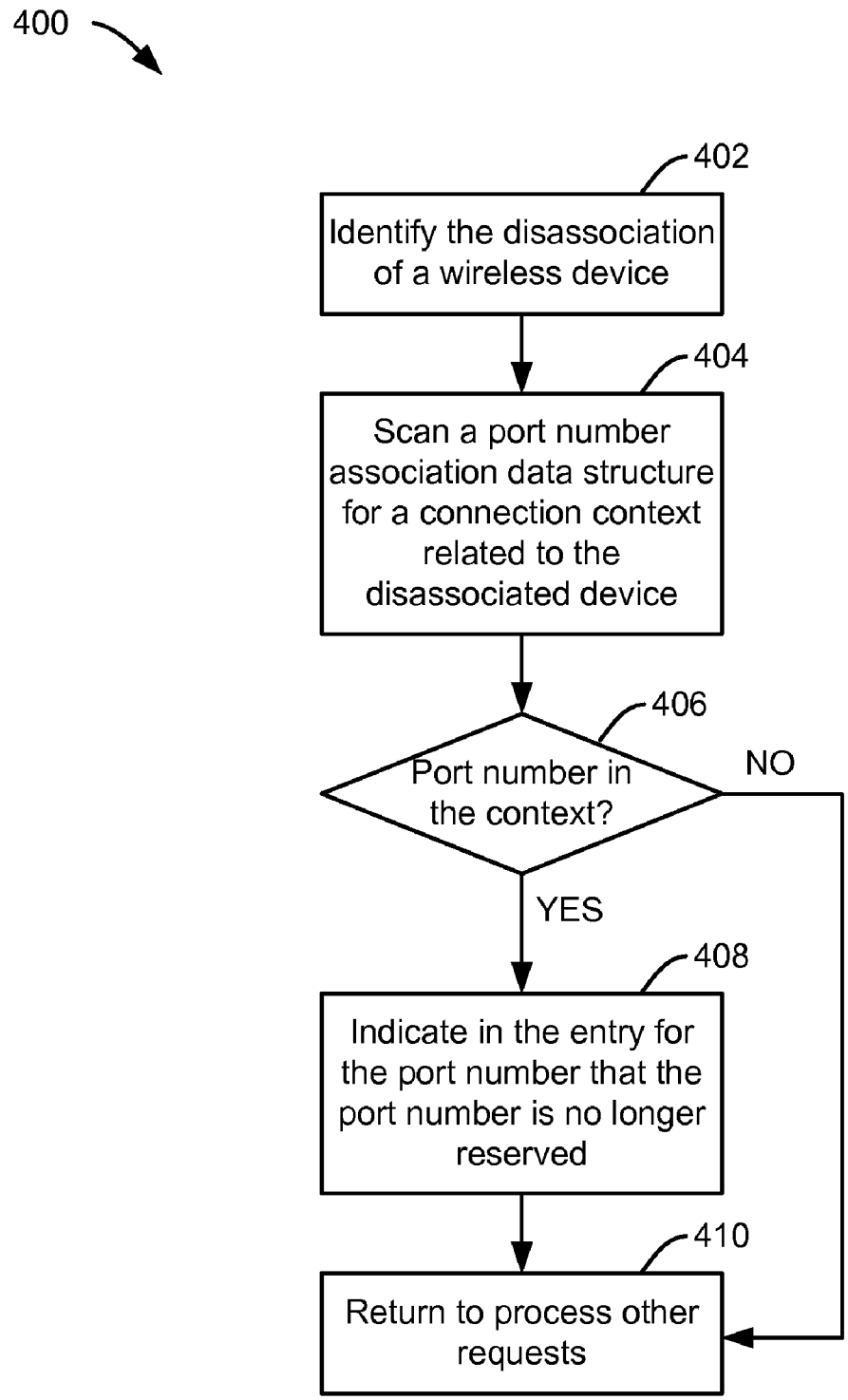
FIG. 4 shows an example process for updating information about a wireless USB device in a port number association data structure.

FIG. 4 shows an example process 400 for updating information about a wireless USB device in a port number association data structure. At block 402, the disassociation of a wireless USB device is identified. At block 404, the port number association data structure is scanned for a connection context related to the disassociated device. At decision block 406, a determination is made whether the virtual port number is in the connection context. If not, process 400 continues at block 410. If the port number is in the connection context, process 400 goes to block 408 where an indication is included in the entry for the port number that the port number is no longer reserved. At block 410, process 400 returns to process other requests.

Figure 5:
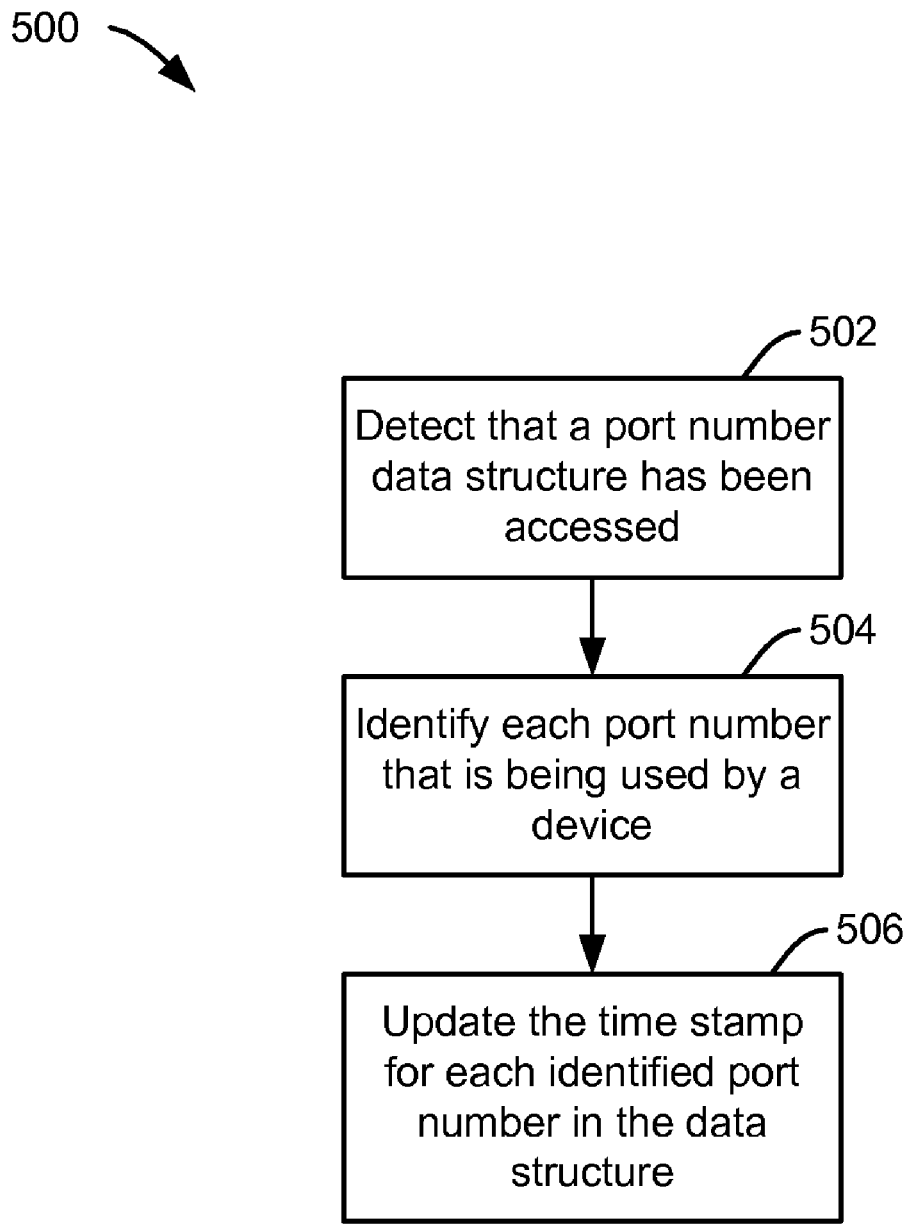
FIG. 5 shows another example process for updating information about wireless USB devices in a port number association data structure.

FIG. 5 shows another example process 500 for updating information about wireless USB devices in a port number association data structure. At block 502, an event is detected where a port number association data structure has been accessed. At block 504, each virtual port number that is currently being used by a wireless device is identified. At block 506, the time stamp for each identified port number in the data structure is updated.

As discussed above, the port number association data structure may be implemented as an array. Below is an example port number association data structure that is implemented as a port reservation array:

```
Typedef struct __WUSB_PORT_RESERVATION_ENTRY {
    WUSBKEY                         CDID;
    BOOL                            Connected;
}WUSB_PORT_RESERVATION_ENTRY,*PWUSB_PORT_RESERVATION_ENTRY;
Typedef struct __WUSB_RADIO_INFORMATION {
    WUSBKEY                         CHID;
    ...
    WUSB_PORT_RESERVATION_ENTRY PortReservationArray[127];
    ...
}WUSB_RADIO_INFORMATION, *PWUSB_RADIO_INFORMATION
```

Fields in the port reservation array may include connection device ID (CDID), connection key (CK), port number, and last seen.

Figure 6:
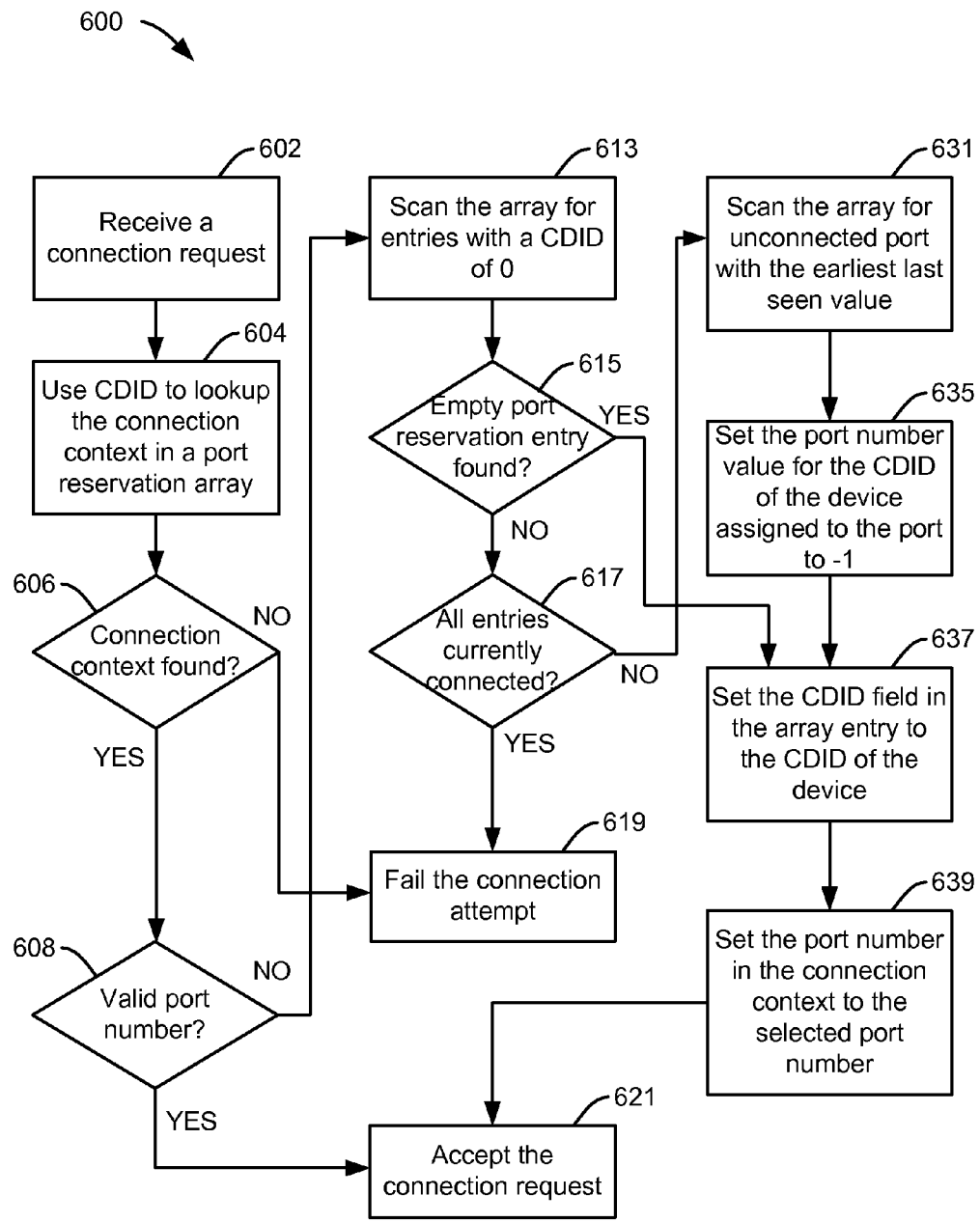
FIG. 6 shows an example process for managing virtual USB port numbers using a port reservation array.

FIG. 6 shows an example process 600 for managing virtual USB port numbers using a port reservation array. The port reservation array is an example type of port number association data structure that contains information about emulated virtual USB port numbers used to provide plug and play functionalities to wireless USB devices. At block 602, a connection request associated with a wireless USB device is received. At block 604, a CDID is used to lookup the connection context in the port reservation array. At decision block 606, a determination is made whether the connection context is found. If not, process goes to block 619.

Returning to decision block 606, if the connection context is found, process 600 moves to decision block 608 where a determination is made whether a valid port number is included in the connection context. If so, process 600 goes to block 621. If no valid port number is included, process 600 goes to block 613 where the array is scanned for entries with a CDID of zero. A CDID of zero in an entry of the array indicates that the virtual port number corresponding to that entry is not associated with any wireless device. At decision block 615, a determination is made whether an empty port reservation entry (e.g. CDID field is zero) is found. If so, process 600 moves to decision block 637.

Returning to decision block 615, if no empty port is found, process moves to block 617 where a determination is made whether all entries are currently connected. If so, process moves to block 619 where the connection attempt is indicated as failed. If not all entries are currently connected, process 600 goes to block 631 where the array is scanned for unconnected port with the earliest last seen value. At block 635, the port number value for the CDID of the device assigned to the port number is set to –1. A port number value of –1 indicates that there is no virtual port number assigned to the wireless device with that CDID.

At block 637, the CDID field in the array entry is set to the CDID of the connecting device. At block 639, the port number in the connection context is set to the selected port number. At block 621, the connection request is accepted.

Figure 7:
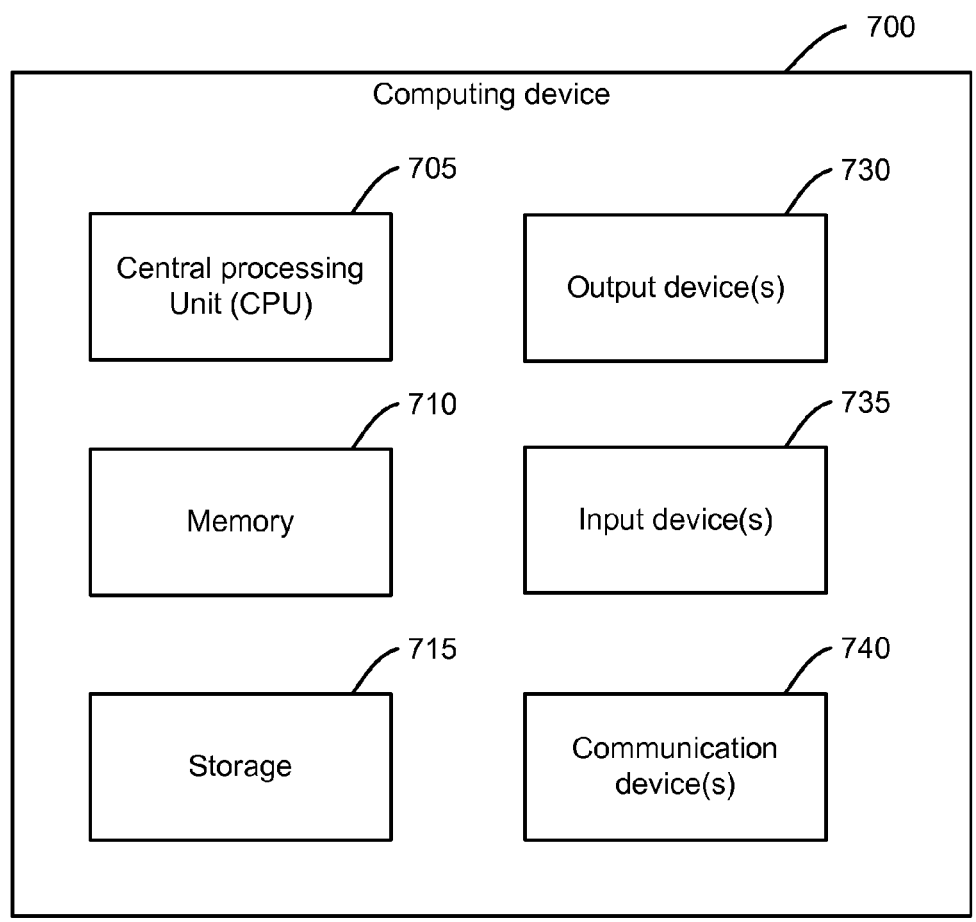
FIG. 7 shows an exemplary computer device for implementing the described systems and methods.

FIG. 7 shows an exemplary computer device 700 for implementing the described systems and methods. In its most basic configuration, computing device 700 typically includes at least one central processing unit (CPU) 705 and memory 710.

Depending on the exact configuration and type of computing device, memory 710 may be volatile (such as RAM), non-volatile (such as ROM, flash memory, etc.) or some combination of the two. Additionally, computing device 700 may also have additional features/functionality. For example, computing device 700 may include multiple CPU's. The described methods may be executed in any manner by any processing unit in computing device 700. For example, the described process may be executed by both multiple CPU's in parallel.

Computing device 700 may also include additional storage (removable and/or non-removable) including, but not limited to, magnetic or optical disks or tape. Such additional storage is illustrated in FIG. 7 by storage 715. Computer storage media includes volatile and nonvolatile, removable and non-removable media implemented in any method or technology for storage of information such as computer readable instructions, data structures, program modules or other data. Memory 710 and storage 715 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 700. Any such computer storage media may be part of computing device 700.

Computing device 700 may also contain communications device(s) 740 that allow the device to communicate with other devices. Communications device(s) 740 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 700 may also have input device(s) 735 such as keyboard, mouse, pen, voice input device, touch input device, etc. Output device(s) 730 such as a display, speakers, printer, etc. may also be included. All these devices are well know in the art and need not be discussed at length.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. One or more device-readable storage media encoded with device-executable instructions for performing steps comprising:
   receiving a request from a wireless Universal Serial Bus (USB) device seeking a connection to a host device;
   identifying a device identifier in the request, the device identifier associated with the wireless USB device;
   generating a virtual USB port number not corresponding to a physical USB port; and
   storing an entry in a data structure that includes the virtual USB port number and the device identifier, wherein the data structure comprises connection context information corresponding to the virtual USB port number, wherein the connection context information includes whether the wireless USB device associated with the virtual USB port number has an active connection, an interval since the wireless USB device last connected to the host device, and information about one or more wireless USB devices that have previously been associated with the virtual USB port number, wherein a connection device ID is stored as an entry in the data structure, a predetermined value of the stored connection device ID indicates that the virtual USB port number corresponding to that entry in the data structure is not associated with any wireless device.

2. The one or more device-readable storage media as recited in claim 1, further comprising:
   identifying a driver associated with the wireless USB device based, at least in part, on the device identifier;
   installing the wireless USB device using the driver; and
   associating driver with the virtual USB port number.

3. The one or more device-readable storage media as recited in claim 2, further comprising:
   receiving another request from the wireless USB device after a period of disconnection;
   identifying the device identifier in the another request;
   searching the data structure for the entry that includes the device identifier; and
   retrieving the virtual port number from the entry returned by the search.

4. The one or more device-readable storage media as recited in claim 3, further comprising:

providing the virtual port number to a plug and play module for uniquely identifying an instance of the wireless USB device.

5. The one or more device-readable storage media as recited in claim 1, further comprising:
  determining that the wireless USB device has been disconnected to the host device;
  identifying the device identifier associated with the wireless USB device;
  identifying the entry that includes the device identifier in the data structure; and
  indicating in the entry that the wireless USB device is disconnected.

6. The one or more device-readable storage media as recited in claim 5, further comprising:
  receiving a second request from a second wireless USB device seeking a connection to the host device;
  searching for a virtual USB port number in the data structure that is not reserved for any wireless USB device; and
  if an unreserved virtual USB port number is found, persisting a second entry in a data structure that includes the unreserved virtual USB port number and a second device identifier associated with the second wireless USB device.

7. The one or more device-readable storage media as recited in claim 6, further comprising:
  if an unreserved USB port number is not found,
    identifying in the data structure another virtual USB port number that is not currently being used by any wireless USB device; and
    assigning the other virtual USB port number to the second wireless USB device in the data structure.

8. The one or more device-readable storage media as recited in claim 7, wherein the second virtual USB port number corresponds to the unconnected wireless USB device that has at least one of the longest interval since last use or the least frequency of use.

9. The one or more device-readable storage media as recited in claim 7, further comprising:
  identifying an entry in the data structure associated with the unconnected wireless USB device; and
  indicating in the identified entry that no virtual USB port number is reserved for the unconnected wireless USB device.

10. The one or more device-readable storage media as recited in claim 1, further comprising:
  detecting that the data structure has been accessed;
  identifying entries in the data structure, each identified entry including a virtual USB port number that is currently being used by a wireless USB device; and
  updating a time stamp in each of the identified entries.

11. A system comprising:
  a connection manager configured to receive connection requests from wireless USB devices and to determine device identifiers associated with the wireless USB devices in the requests, the connection manager also configured to generate virtual port numbers and to associate the virtual port numbers with the corresponding device identifiers, the connection manager further configured to store each device identifier and the associated virtual port numbers in an entry of a port number association data structure and to provide the device identifiers and the virtual port numbers to another component in the system; and
  an automated device configurator configured to enumerate and install the wireless USB devices based, at least in part, on the device identifiers and the virtual port numbers, the automated device configurator also configured to provide automated connection functionality to the wireless USB devices for subsequent enumerations using the device identifiers and the virtual port numbers,
  wherein the port number association data structure includes connection context information for each of the virtual port numbers, wherein the connection context information includes whether a wireless USB device associated with a virtual port number has an active connection, and a time interval since a wireless USB device last connected to a host device.

12. The system as recited in claim 11, wherein the connection manager is further configured to reassign a reserved virtual port number to another wireless USB device based on connection status.

13. The system as recited in claim 11, wherein the connection manager is further configured to maintain a last seen value for each virtual port number that is associated with a wireless USB device.

14. A computer-readable storage medium including:
  computer-readable instructions, the computer readable instructions including instructions for causing at least one processor to perform the following acts:
  receiving requests from wireless USB devices seeking connection with a host device;
  determining a device identifier for each wireless USB device;
  generating a virtual port number associated with each device identifier;
  enumerating each wireless USB device using the device identifier and the corresponding virtual port number;
  reserving the virtual port numbers for the wireless USB devices;
  using the virtual port numbers to provide automated connection functionality to the wireless USB devices for subsequent enumerations; and
  storing the virtual port numbers and the associated device identifiers in a port reservation array, wherein the port reservation array includes connection context information for each of the virtual port numbers, wherein the connection context information includes whether a wireless USB device associated with a virtual port number has an active connection, an interval since a wireless USB device last connected to a host device, and information about one or more wireless USB devices that have previously been associated with a virtual port number.

15. The computer-readable medium as recited in claim 14, further comprising the act of assigning a virtual USB port reserved for a first wireless USB device to a second wireless USB device based on connection status.

16. The computer-readable medium as recited in claim 14, further comprising the act of persisting a last seen value in a port reservation array.

17. The computer-readable medium as recited in claim 14, further comprising the act of using the virtual port numbers to enable at least one legacy application to work with wireless USB devices, wherein the at least one legacy application also uses port numbers corresponding to physical ports to identify wired USB devices.

\* \* \* \* \*